Sept. 25, 1934.  W. E. RODLER  1,974,657
HYDRAULIC CONTROL DEVICE
Filed Dec. 2, 1931  3 Sheets-Sheet 1
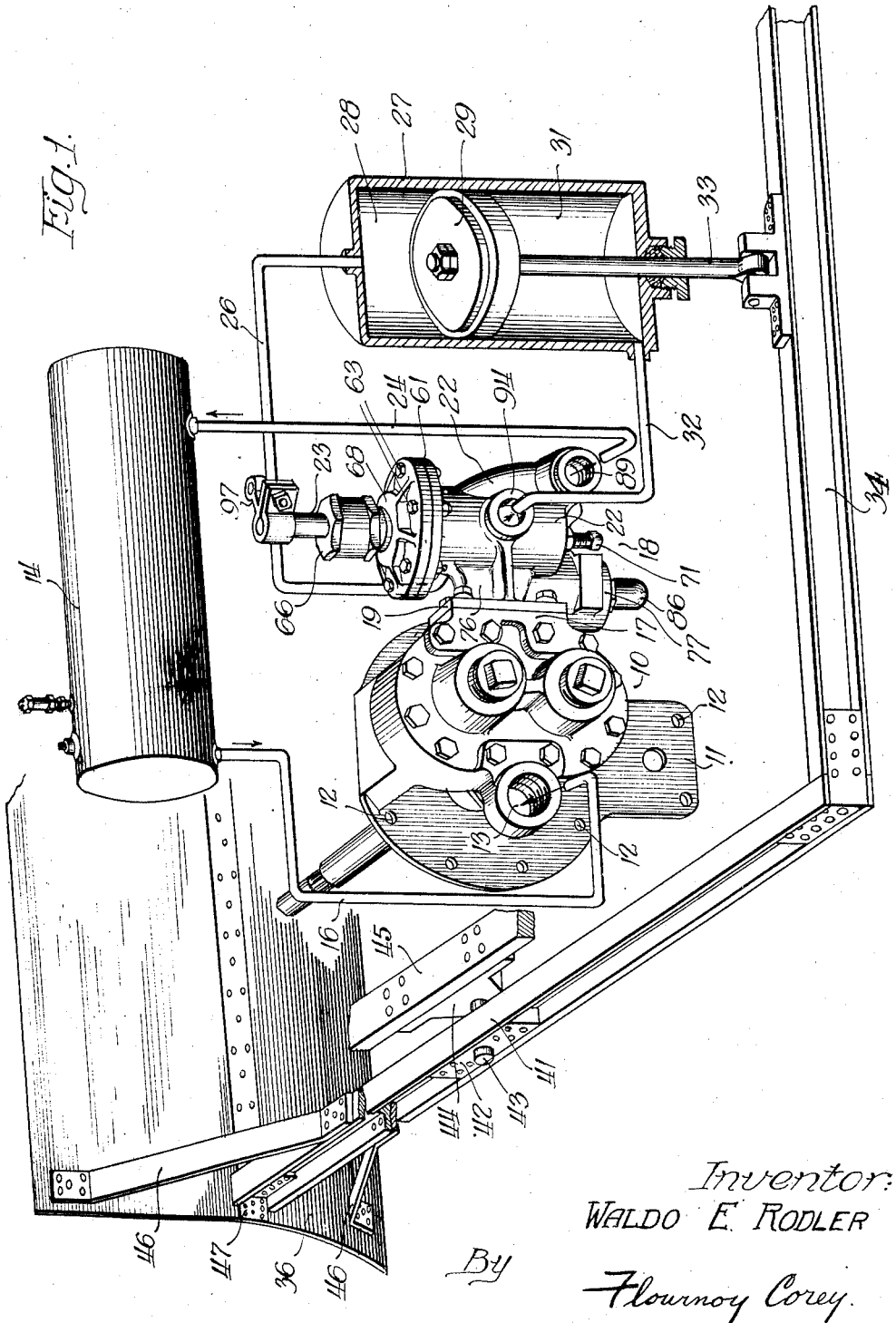
Inventor:
WALDO E. RODLER
By Flournoy Corey.
Atty.

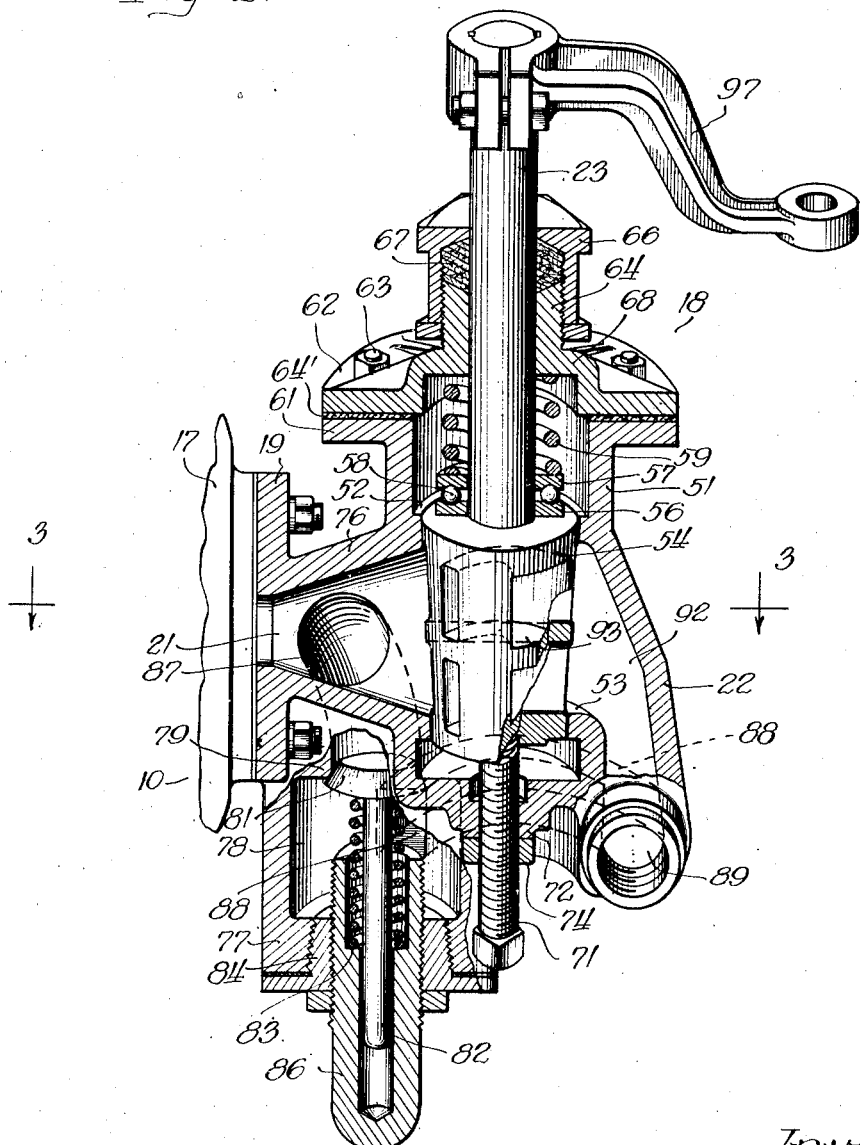

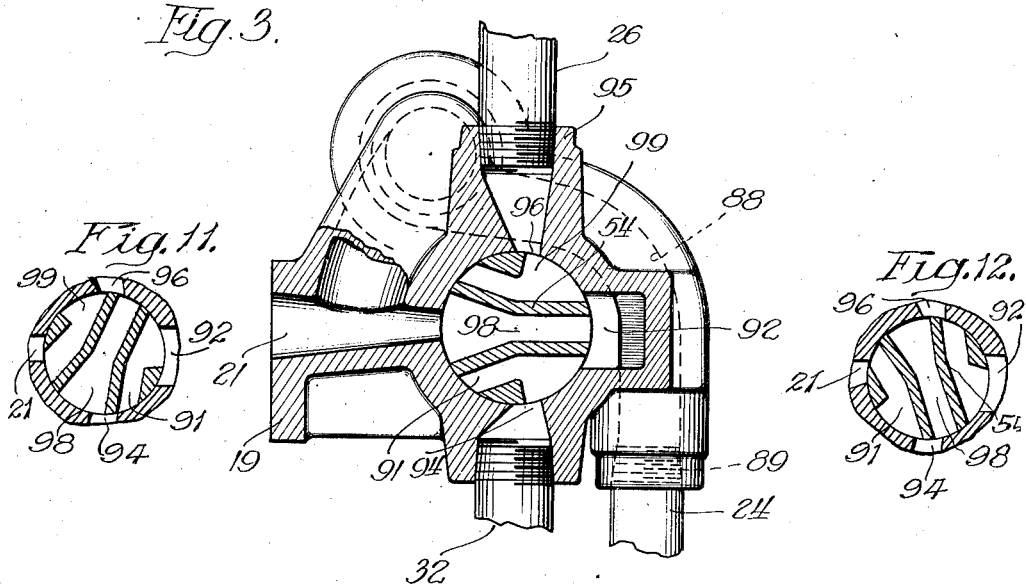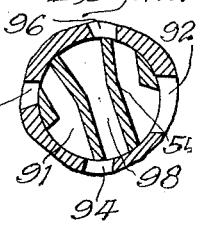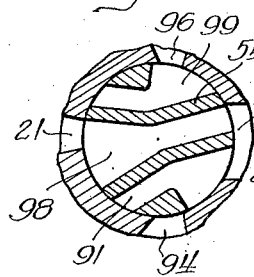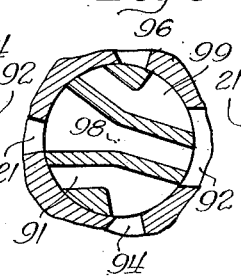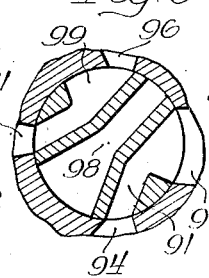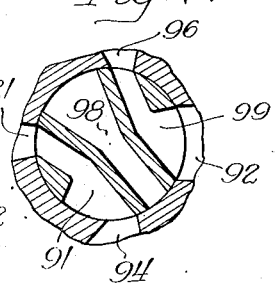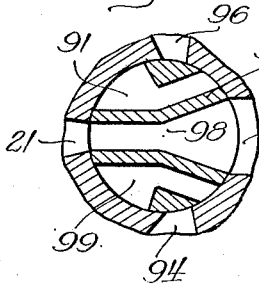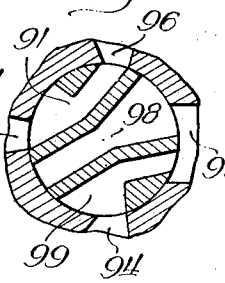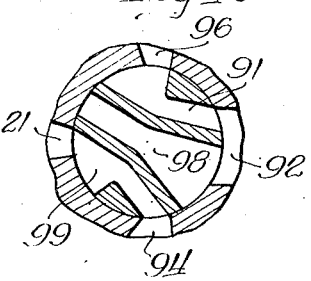

Patented Sept. 25, 1934

1,974,657

UNITED STATES PATENT OFFICE 1,974,657

HYDRAULIC CONTROL DEVICE

Waldo E. Rodler, Cedar Rapids, Iowa, assignor to La Plante-Choate Manufacturing Co. Inc., Cedar Rapids, Iowa, a corporation of Delaware Application December 2, 1931, Serial No. 578,511

5 Claims. (Cl. 60—52)

This invention relates to hydraulic systems and more particularly to a control for such systems.

It is the general object of the present invention to provide a novel and improved form of control system and valve for controlling the flow of fluids.

More particularly it is an object of the invention to provide a selectively operative valve having a plurality of ports to cause the directed flow of fluid therethrough to perform a plurality of functions at the same time.

A more specific object of the invention consists in providing a new and improved valve structure such that fluid under pressure may be made to flow to and from a device such as a hydraulic jack, or may be permitted to circulate freely to and from the device, or such that the flow of fluid to and from the device may be prevented, and yet such that fluid may be by-passed from the pump or other device furnishing the pressure when it is not being used to operate the device.

Another specific object of the invention is to provide a valve structure in which the movements of the parts are easily accomplished, and yet such that the sealing of the fluid is complete.

An important feature of the invention resides in the provision of a valve structure wherein a large number of parts can be formed upon a plate as a sub-assembly, which is later secured to the pump structure, eliminating considerable work on the pump and valve during assembly, disassembly and repair thereof.

Other and further features and objects of the invention will be more apparent to those skilled in the art upon a consideration of the accompanying drawings and following specification, wherein is disclosed a single, exemplary embodiment of the invention with the understanding, however, that such changes may be made therein as fall within the scope of the appended claims without departing from the spirit of the invention.

In said drawings:

Figure 1 is a view in perspective of a valve constructed according to my invention as it is applied to a pump and hydraulic system for raising and lowering a scraper blade, a plow or like device. The pump and valve have been shown in enlarged detail with relation to the remainder of the system in order to better illustrate the details thereof.

Figure 2 is a view in perspective of the valve structure shown in Figure 1. Part of the structure is shown in section and other parts have been broken away in order to better show the details of construction.

Figure 3 is a view in section of the valve structure taken along the line III—III of Figure 2.

Figures 4 to 7 inclusive are diagrammatic sectional views of the valve and the ports in the valve housing, arranged to illustrate the positions the valve, shown in Figures 2 and 3, may assume in controlling the flow of fluid through the valve.

Figures 8 to 10 inclusive are illustrative of the positions the valve shown in Figure 3 may assume when the value has been placed in a reversed position, and Figures 11 and 12 are illustrative of a pair of "overtravel" positions the valve may take while in transition between the normal positions shown in Figures 5, 6 and 7 and its reversed position shown in Figures 9 and 10.

The present invention deals particularly with a fluid flow control system suitable for operating a hydraulic jack or the like, but it is quite apparent that the control system and mechanism involved may be used for a large variety of purposes and is susceptible to a considerable variation in structure and form without departing from the spirit of the invention.

The invention has been particularly shown and described in connection with a hydraulic jack suitable for raising and lowering a road scraper, a plow or like instrument. Such devices are usually mounted upon, or drawn by tractors, which are powered by internal combustion engines or other prime movers having means associated therewith to drive a pump for operating the jack.

In some cases it is desirable that the scraper blade be held rigidly in a position such that the bottom of the blade is a pre-determined distance above or below the surface of the earth. At other times it is desirable that the scraper blade be permitted to float freely upon the top of the ground by its own weight, as for instance when it is desirable to level a pile of loose material. It is also necessary that the hydraulic system be able to raise and lower the scraper blade and hold it in any desired position.

In a preferred embodiment of the invention it is desirable that the fluid pump be continuously operating during the operation of the prime mover and it is therefore desirable that a passageway be provided to permit discharge of the pump back into the supply line without appreciable resistance to the flow of fluid during the period when the pump is not being used to operate the jack.

It is desirable that a mechanism be provided which will so control the flow of fluid as to selectively secure these results. It is desirable that the control mechanism be of simple unitary construction in order to avoid the expense of a complicated system of parts and the expense incident to assembling and disassembling these parts.

I have observed the need for such a device and control system and have therefore invented a mechanism which will secure the desired results.

My invention may be best understood by reference to the accompanying drawings and particularly to Figure 1 thereof, in which is shown a gear pump 10 of usual construction, which is provided with a face plate 11, having openings 12 therein, by means of which the pump may be bolted to the crank case of an internal combustion engine (not shown).

The pump is preferably in continuous engagement with the crank shaft or a driving shaft of the internal combustion engine. Oil or other suitable fluid is introduced into the intake opening 13 of the pump from a supply tank 14 by means of a duct or pipe 16. The oil passes into the pump and is carried around by the teeth of the gears and discharged from the right hand side through a suitable port in the wall 17 of the pump.

My improved valve mechanism 18 is secured, by means of a face plate 19, to a suitably flattened portion of the wall 17 of the pump so that a port 21 in the valve housing 22 covers the exhaust port of the pump. However, this valve can be located at any other convenient point. When the valve 23 is located in any one of several neutral positions, as hereinafter described, the fluid discharged from the pump passes into the valve housing 22 through suitable ports in the valve 54 and out through a pipe 24 and back into the supply tank 14. In certain of these neutral positions, oil is prevented from flowing to and from the hydraulic jack cylinder 27 by the closing of certain ports in the valve, whereby the piston is prevented from moving.

In another position of the valve stem 23, oil from the pump is directed through certain passageways in the valve 18, into the pipe 26, to the hydraulic cylinder 27 and into the chamber 28, located above the piston 29, to drive the piston downward. The oil in the chamber 31, below the piston, is forced out of the cylinder through the pipe 32, through other passageways in the valve 18, into the discharge line 24, and back into the supply tank. A reversed position of the valve causes reversal of the flow just described to raise the piston.

The downward movement of the piston 29 and the consequent downward movement of the rod 33 causes a corresponding downward motion of the rear portion of the framework 34 used for supporting the scraper blade 36. The framework 34, in the present embodiment of the invention, is shown as being pivotally supported at some midpoint 41 as by means of the block 42 and pin 43, with the pin 43 secured to a suitable bracket 44 on the framework 45, which in turn is secured to the tractor frame. The scraper blade 36 may be fastened in any suitable manner to the frame 34 as by means of brackets 46 and 47.

If the piston is moved downward, the consequent downward motion of the rear portion of the framework 34 will cause upward movement of the scraper blade 36, while upward movement of the piston results in the downward movement of the blade. If the oil is allowed to flow freely between chambers 28 and 31, the piston 29 may move freely in the cylinders and the scraper blade rests on the surface of the ground by reason of its own weight. If no oil may flow between chambers 28 and 31 of the cylinder 27, the piston 29 is locked in position to prevent any movement of the blade 36.

It is apparent that the valve 18 performs at least five different functions, some of the functions being performed simultaneously. The construction of the valve may better be understood by reference to the Figures 2 to 10 inclusive taken in connection with Figure 1.

In the preferred embodiment of the valve structure shown, the valve housing 22 is comprised of a substantially cylindrical portion 51, having circular valve seats 52 and 53 therein, in which a tapered, cylindrical valve 54 may be located. The upper part of the cylindrical portion 51 affords a chamber or housing in which the two races 56 and 57 of an anti-friction bearing, the bearings 58 and a spring 59 may be located. A horizontally-extending flange 61 affords a means by which a cover plate 62 may be bolted to the valve housing 22 as by the means of the bolts 63.

An upstruck portion 64 of the cap 62 closely engages the stem or shaft 23 and affords a means by which a packing nut 66 may be threaded on the cap so that the packing 67 may be made to tightly seal the cap with reference to the shaft 23. A gasket 64' is disposed between the two corresponding flanges of the housing 22 and the cap 62. The spring 59 bears against the underside of a suitably recessed portion 68 of the cap and against the race 57 to afford pressure through the anti-friction bearings 58 and the race 56 whereby the tapered valve portion 54 is tightly seated in the valve seats 52 and 53. Although the spring 59 may apply considerable pressure to the tapered portion 54, the races 56 and 57 roll freely on the bearings so that friction between the stem and the spring and the housing is considerably minimized. A set screw 71 passes through the lower wall 72 of the valve housing and may be adjusted to bear against the lower end of the valve 54 to prevent the same from wedging in the valve seat by reason of the pressure of the spring 59. The set screw 71 may be locked in place by means of a lock nut 74.

A horizontally-extending portion 76 of the valve housing 22 is provided with the port or channel 21 to permit oil from the pump 10 to flow constantly into the valve housing, and the valve housing is bolted to the pump by means of the flange 19 on the portion 76. An offset cylindrical portion 77 of the housing 22 is arranged to provide a chamber 78 and a valve seat 79, in which are located a relief valve 81, a valve stem 82, a valve spring 83 for holding the valve in closed position, and fittings 84 and 86 for sealing the chamber 78. The channel 87 leads from the intake port 21 to the valve 81, and any excess pressure of fluid within the channels 21 and 87 will cause movement of the valve 81 downward against the biasing action of the spring 83 to permit the flow of oil to relieve any excess pressure. The oil that flows past the valve into chamber 78 discharges through a circular passageway 88 located at the base of the housing 22 and out through the exhaust port 89. It is undesirable to utilize the excess pressure discharge arrangement as a means for by-passing oil from the pump through the valve because the throttling action of the relief valve causes back pressure on the pump and consequent power loss at the pump. For this reason the ports in the valve are arranged so that the passageways from the pump are never entirely closed and the relief valve only becomes operative during transitional periods or when abnormal loading conditions occur.

The tapered, cylindrical portion 54 of the valve is provided with a plurality of ports or openings therethrough, which are hereinafter more particularly described. The ports are in the form of slots at the point where the liquid enters the stem in order that relatively small movements of the stem 23 will completely cover and uncover the proper ports to secure flow of the oil in the desired direction. The inner end of the inlet port or channel 21 and the upper end 92 of the exhaust port or channel 89 are correspondingly increased in their vertical dimensions and reduced in their horizontal dimensions. The valve 54 is provided with a reinforcing rib 93, which divides each port into two parts.

A better explanation of the structure and operation of the valve may be had by reference to Figures 3 to 10 inclusively. A pair of ports 94 and 96, which may be termed the jack line ports, are provided in opposed relation in the side wall of the cylinder 51. One of these ports 96 is connected by means of the pipe 26 with the upper chamber 28 of the hydraulic jack 27, while the other port 94 is connected by means of the pipe 32 with the lower chamber 31 of the jack.

Rotation of the stem 23 is secured by moving the lever arm 97. The various positions of the lever arm, and hence the stem, are determined by any suitable mechanism such as a sector and latch mechanism (not shown).

In a middle or neutral position of the valve 54, shown in Figure 3, liquid passes from the gear pump into the intake passage 21, through the central port 98 in the valve 54, out and downward through channel 92, out the exhaust port 89 and back into the supply tank. In this position the oil may also flow freely between the port 94 and through the side port 91 in the valve, into the channel 92, through the side port 99 and through the port 96, so that the bottom chamber 31 and the top chamber 28 of the jack are in free communication with each other, and the pump discharges freely, except for frictional losses, back into the supply tank. In this position of the valve, it is apparent, therefore, that the piston will float freely within the cylinder, and that any device, such as the scraper blade, ordinarily controlled by the hydraulic jack, will determine its own position by reason of its weight.

In the position of the valve shown in Figures 4 and 5, the pump still discharges through the channel 98 and the port 92 back into the supply tank, but the ports 94 and 96 are closed, and the oil cannot flow into or out of the chambers of the jack. It is apparent that in these positions of the valve stem the scraper or other device will be held rigidly in position, as for instance in making a cut or fill.

In the position shown in Figure 6, the pump now discharges through the port 21 into the port 99 in the valve, and out through the port 96, so that oil under pressure is delivered into the chamber 28 of the jack. The port 92 is now in communication with the port 94 by means of port 91, so that the oil in chamber 31 is discharged through port 92 and back into the supply tank to raise the scraper blade.

In a reversed position of the stem shown in Figure 7, the oil from the pump passes through the port 21, through the port 91, and out through the port 94, to the chamber 31 of the jack, to lower the scraper blade. The oil in the chamber 28 is discharged through the port 96, the port 99 in the valve, and the discharge port 92, into the supply tank.

If it is desirable to omit passing through the positions shown in Figures 4 and 5, that is, if it is desired that the piston never be in a "floating" condition, the stem 23 may be reversed 180 degrees, so that it may selectively occupy the positions shown in Figures 8 to 10.

In this arrangement of the valve, as shown in Figure 8, when the valve is in the neutral position oil discharges through the port 21, through the channel 98, and out the exhaust port 92. The ports 94 and 96 are closed and the piston is locked in place. No action occurs until the stem has been moved to a position such as is shown in Figure 9, in which condition oil is discharged from the pump, through the port 21, through the channel 91 in the valve, and through the port 96 to the top chamber 28 of the cylinder. The oil in the lower chamber 31 is discharged through the port 99 and into the supply tank.

In the reversed position of the stem shown in Figure 10, oil is delivered under pressure to the bottom chamber 31 in the jack by means of the channel 99 and the oil from the upper chamber 28 is discharged into the supply tank through the port 91.

A pair of intermediate positions of the valve, illustrated in Figures 11 and 12 occur during the transitional period when the valve is being moved from the normal operating positions to the "reversed" position. These may be considered as "overtravel" reversed positions and are reached by continuing the motion of the valve by which it is moved to the reversed operating positions shown in Figures 9 and 10 to the normal final positions shown in Figures 6 and 7. It will be noted that when the valve is in either of the positions of Figures 11 or 12, owing to the relatively thin inner walls of the valve ports 91 and 99, and the relatively wide valve housing ports 21, 92, 94 and 96, all of the ports are in communication with each other and the pump pumps oil directly to the supply tank. The jack line ports are in communication with each other and consequently the plow blade will "float" when the valve is in this position.

It is apparent that I have devised a simple and reliable mechanism for securing a large group of fluid flow control conditions, and that the mechanism involved is comprised of only a few parts and is of rugged and easily operated construction.

Having thus described the invention, what is claimed as new and desired to be secured by Letters Patent is:

1. A substantially cylindrical valve housing having four ports arranged in a transverse plane and substantially equally spaced about the circle of the housing and a valve having three substantially parallel passageways therethrough, the middle passageway being larger at one end than at the other whereby the large end communicates with the first one of the ports in three of the operative positions of the valve, and the opposite, and second port being enlarged whereby the small end of the middle passageway communicates with the second port in all three of the operative positions of the valve, but whereby in an intermediate neutral position of the valve, the third and fourth ports of the housing also communicate with the second port by means of the outer passageways in the valve.

2. A substantially cylindrical valve housing having four ports arranged in a transverse plane and substantially equally spaced about the circle of the housing, and a valve having three substantially parallel passageways therethrough, the middle passageway being larger at one end than at the other whereby the large end communicates with the first one of the ports in three of the operative positions of the valve and the opposite and second port being enlarged, whereby the small end of the middle passageway communicates with the second port in all three of the operative positions of the valve, but whereby in an intermediate neutral position of the valve, the third and fourth ports of the housing also communicate with the second port by means of the outer passageways in the valve, and whereby in the remaining two positions of the valve, one of the outer walls of the outer passageways seals either the third or fourth port, and the remaining port is sealed because the adjacent passageway of the valve is out of register with any other port.

3. In a hydraulic control device, a valve housing having an intake and an exhaust port oppositely disposed in the walls thereof and having a pair of jack line ports disposed at ninety degrees and in the same plane with the intake and exhaust ports, and a valve having four partitions therein arranged to define three channels therethrough, the two innermost walls being divergent with respect to each other whereby the innermost channel is larger at one end than at the other, and the outermost partitions being arranged to define channels which are divergent in the other direction from the central channel, whereby the outer channels are larger at opposite ends from the innermost channels, the large end of the outermost channels being of sufficient width to afford, in one set of positions of the valve, communication between the jackline ports and the exhaust port, and the large end of the inner channel being of sufficient width and the exhaust port being of sufficient width to permit communication of the intake port with the exhaust port in three other positions of the valve.

4. In a hydraulic control device, a valve housing having four equally spaced, oppositely-disposed ports therein, one of said ports being of approximately three times the width of the remaining ports, and a valve for the housing having four partitions adapted to define three tapering passageways, the two outside passageways tapering in the same direction and the innermost passageway tapering in the opposite direction, the smaller end of the valve passageways being approximately the same width as the three small ports of the housing and the large ends of the three passageways being substantially the same width as the large port in the housing.

5. A cylindrical valve housing having four ports disposed in equally spaced relation in a transverse plane through its wall, one of said ports being materially larger than the other three, and a valve having three substantially parallel funnel-shaped channels therethrough, the channels at their large ends being of substantially the same width as the large port, and at the small ends being of substantially the same width as the three smaller ports, the two outside channels being disposed in opposite relation to the inner channel.

WALDO E. RODLER.